US010652396B2

(12) United States Patent
Koster et al.

(10) Patent No.: US 10,652,396 B2
(45) Date of Patent: May 12, 2020

(54) STREAM SERVER THAT MODIFIES A STREAM ACCORDING TO DETECTED CHARACTERISTICS

(71) Applicant: International Business Machines Corporation, Armonk, NY (US)

(72) Inventors: David M. Koster, Rochester, MN (US); Andrew Thorstensen, Morrisville, NC (US); Adam D. Reznechek, Rochester, MN (US); Jason A. Nikolai, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/144,217

(22) Filed: Sep. 27, 2018

(65) Prior Publication Data
US 2020/0106885 A1 Apr. 2, 2020

(51) Int. Cl.
*H04M 3/56* (2006.01)
*H04L 29/06* (2006.01)
*G10L 15/07* (2013.01)
*G10L 15/24* (2013.01)
*G10L 15/00* (2013.01)
*H04M 3/493* (2006.01)
*G10L 15/20* (2006.01)

(52) U.S. Cl.
CPC ............ *H04M 3/568* (2013.01); *G10L 15/07* (2013.01); *H04L 63/102* (2013.01); *H04L 65/1006* (2013.01); *G10L 15/00* (2013.01); *G10L 15/20* (2013.01); *G10L 15/24* (2013.01); *H04M 3/4936* (2013.01); *H04M 2201/40* (2013.01); *H04M 2203/352* (2013.01); *H04M 2250/74* (2013.01)

(58) Field of Classification Search
CPC ........... H04M 2201/40; H04M 3/4936; H04M 2250/74; H04M 2203/352; G10L 15/20; G10L 15/24; G10L 15/00
See application file for complete search history.

(56) References Cited

U.S. PATENT DOCUMENTS

| 8,515,041 | B2 * | 8/2013 | Byrne | H04M 3/568 |
| | | | | 379/202.01 |
| 8,630,283 | B1 | 1/2014 | Breau et al. | |
| 10,089,067 | B1 * | 10/2018 | Abuelsaad | H04M 3/569 |
| 2005/0238000 | A1 | 10/2005 | Pollock et al. | |
| 2006/0276230 | A1 | 12/2006 | McConnell | |
| 2009/0059939 | A1 | 3/2009 | Anderson, IV | |
| 2011/0044474 | A1 * | 2/2011 | Grover | H04M 3/40 |
| | | | | 381/107 |

\* cited by examiner

*Primary Examiner* — Jaime M Holliday
(74) *Attorney, Agent, or Firm* — Martin & Associates, LLC; Derek P. Martin

(57) ABSTRACT

A stream server manages connections by multiple clients. The stream server receives, sends and manages streams for each client. The stream server analyzes incoming streams and maintains a database of device signatures and a database of user profiles based on the analyzed data. The stream server receives a stream from a client, analyzes the stream to identify an applicable device signature, user profile, or both, and modifies the stream. Modification of the stream may include filtering noise, placing the user in receive-only mode, ending a session for a user, adjusting metadata, etc. In addition, modification of the stream may vary based on the role or authorization of the user, or based on commands from one or more of the users.

17 Claims, 8 Drawing Sheets

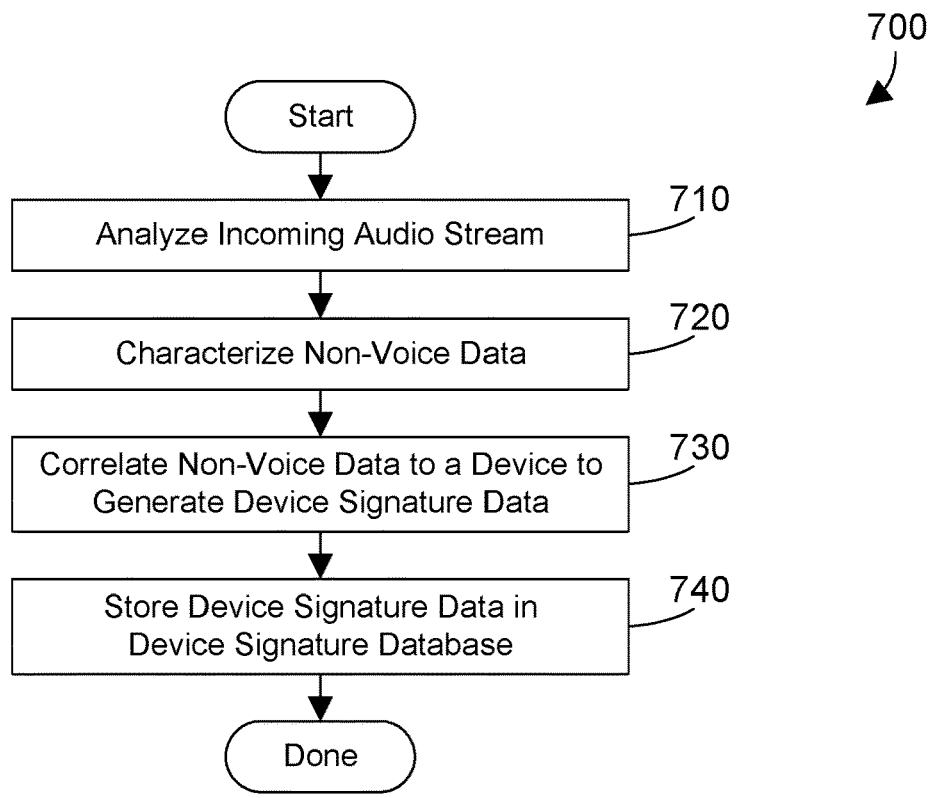

STREAM SERVER THAT MODIFIES A STREAM ACCORDING TO DETECTED CHARACTERISTICS

BACKGROUND

1. Technical Field

This disclosure generally relates to processing of data streams in a computer system, and more specifically relates to processing data streams.

2. Background Art

Streaming applications are known in the art, and typically include multiple operators coupled together in a flow graph that process streaming data in near real-time. An operator typically takes in streaming data in the form of data tuples, operates on the tuples in some fashion, and outputs the processed tuples to the next operator. Streaming applications are becoming more common due to the high performance that can be achieved from near real-time processing of streaming data.

One specific application for streaming applications is in digital telephony. Modern digital telephone systems use streams of digital data packets to communicate voice data. Because a streaming application can process streaming data in near real-time, this makes streaming applications well-suited to digital telephony. Due to the reliability required from telephone infrastructure, many modern digital telephone systems use Session Initiation Protocol (SIP) for processing streaming voice data.

Even though many telephone systems have been upgraded to digital telephone systems, there still arise problems in dealing with analog "last mile" infrastructure, and a number of older analog components that are still allowed to operate on telephone networks. For example, analog lines and analog phones may have noise that is not present on digital lines. When a person uses a telephone connected to analog infrastructure to call into a conference call on a digital telephone system, the noise on the analog line can disrupt the entire conference call.

BRIEF SUMMARY

A voice stream server is part of a digital telephone system that manages connections to a conference call by multiple callers. The voice stream server receives, sends and manages audio streams for each caller. The voice stream server analyzes audio streams incoming from callers and maintains a database of device signatures and a database of caller profiles based on the analyzed data. The voice stream server receives an audio stream from a caller, analyzes the audio stream to identify an applicable device signature, caller profile, or both, and modifies the audio stream. Modification of the audio stream may include filtering noise, placing the caller in listen-only mode, ending a session for a caller, adjusting voice volume, etc. In addition, modification of the audio stream may vary based on the role or authorization of the caller, or based on verbal commands from one or more of the callers.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

FIG. 7 is a flow diagram of a method for storing device signature data in a device signature database based on analyzing an incoming audio stream for non-voice data;

FIG. 8 is a table showing one suitable example of a device signature database;

FIG. 9 is a table showing suitable examples of device signature data that could be included in the device signature database in FIG. 8;

DETAILED DESCRIPTION

The disclosure and claims herein are directed to a voice stream server that is part of a digital telephone system and manages connections to a conference call by multiple callers. The voice stream server receives, sends and manages audio streams for each caller. The voice stream server analyzes audio streams incoming from callers and maintains a database of device signatures and a database of caller profiles based on the analyzed data. The voice stream server receives an audio stream from a caller, analyzes the audio stream to identify an applicable device signature, caller profile, or both, and modifies the audio stream. Modification of the audio stream may include filtering noise, placing the caller in listen-only mode, ending a session for a caller, adjusting voice volume, etc. In addition, modification of the audio stream may vary based on the role or authorization of the caller, or based on verbal commands from one or more of the callers.

Figure 1:
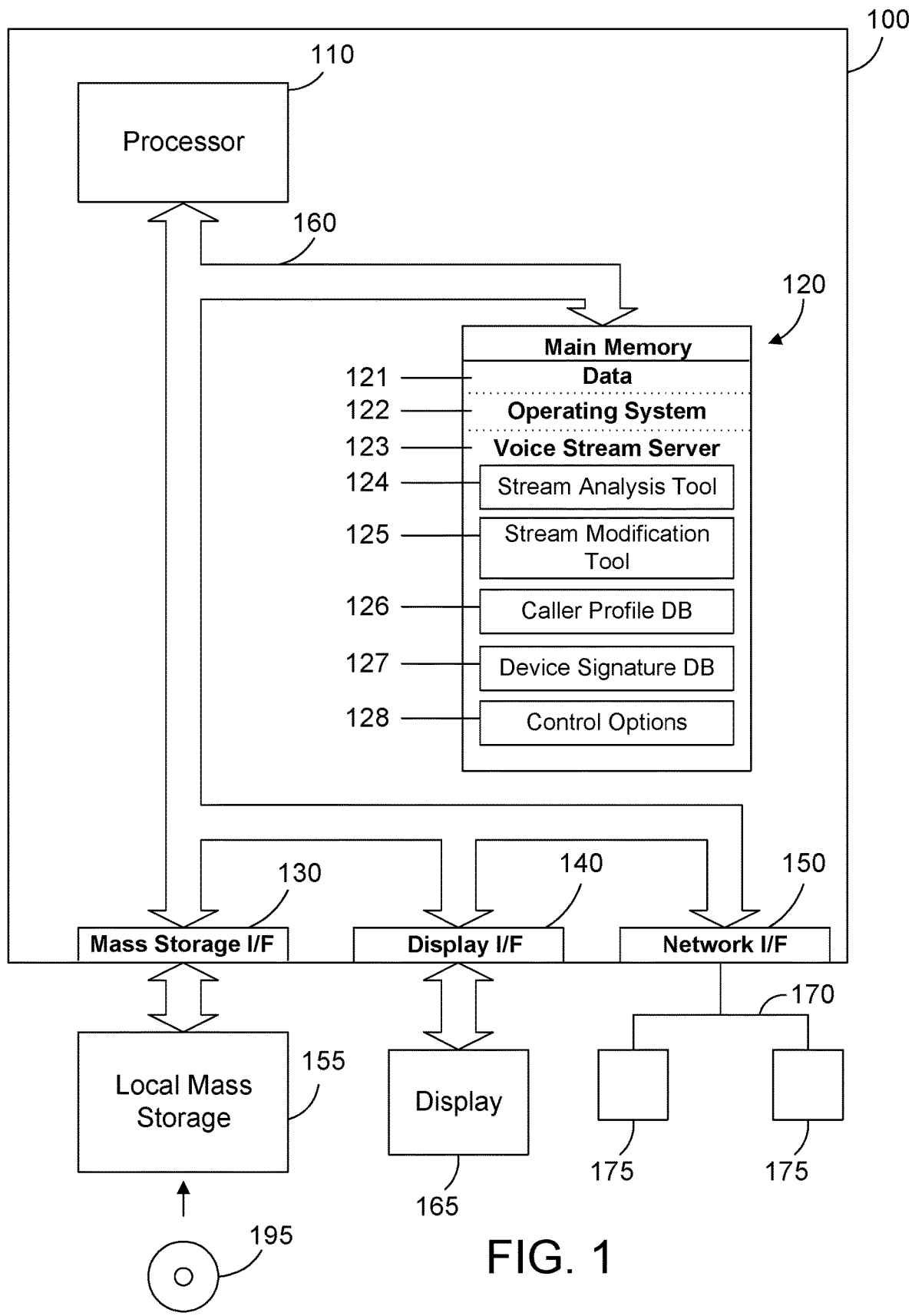
FIG. 1 is a block diagram of a computer system that includes a voice stream server that dynamically modifies audio streams that include voice information.

Referring to FIG. 1, a computer system 100 is one suitable implementation of a computer system that includes a voice stream server as described in more detail below. Computer system 100 is an IBM POWER8 computer system. However, those skilled in the art will appreciate that the disclosure herein applies equally to any computer system, regardless of whether the computer system is a complicated multi-user computing apparatus, a single user workstation, a laptop computer system, a tablet computer, a phone, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as local mass storage device 155, to computer system 100. One specific type of local mass storage device 155 is a readable and writable CD-RW drive, which may store data to and read data from a CD-RW 195. Another suitable type of local mass storage device 155 is a card reader that receives a removable memory card, such as an SD card, and performs reads and writes to the removable memory. Yet another suitable type of local mass storage device 155 is universal serial bus (USB) that reads a storage device such a thumb drive.

Main memory 120 preferably contains data 121, an operating system 122, and a voice stream server 123. Data 121 represents any data that serves as input to or output from any program in computer system 100. Operating system 122 is a multitasking operating system, such as AIX or LINUX. Voice stream server 123 manages streaming audio from many sources, such as telephone calls, and modifies the streaming audio as described in more detail below. The voice stream server 123 could be part of a digital telephone system. Note the term "voice stream server" does not imply the server only deals with voice portions of audio streams. To the contrary, as discussed in detail below, the voice stream server 123 can modify an audio stream based on voice characteristics of the audio stream and/or based on non-voice characteristics of the audio stream. The term "audio stream" as used herein broadly means any digital data stream that includes both voice and non-voice information. In the most preferred implementation, the audio streams referenced herein are streams of digital data packets that include digital audio data. The voice stream server 123 preferably includes a stream analysis tool 124, a stream modification tool 125, a caller profile database 126, a device signature database 127, and control options 128. Stream analysis tool 124 analyzes an audio stream incoming to the voice stream server, and determines the voice portion of the audio stream and the non-voice portion of the audio stream. The stream modification tool 125 preferably modifies an incoming audio stream according to defined criteria discussed in more detail below. The caller profile database 126 is a database that preferably includes entries for different callers, and includes voice characterization data in each entry for a given caller. The voice characterization data in the call profile database 126 may be used by the stream modification tool 125 to modify an incoming audio stream. The device signature database 127 is a database that preferably includes device signature data in each entry that characterizes the non-voice portion of an incoming audio stream. In the most preferred implementation, a call to the voice stream server 123 will be characterized by the voice of the caller in the voice portion of the incoming audio stream and by the non-voice portion of the incoming audio stream that characterizes the device the user used to make the call. Control options 128 include options that may be specified to control the function of the voice stream server, such as role/authorization of a user, voice commands, etc., as discussed in more detail below.

Computer system 100 utilizes well known virtual addressing mechanisms that allow the programs of computer system 100 to behave as if they only have access to a large, contiguous address space instead of access to multiple, smaller storage entities such as main memory 120 and local mass storage device 155. Therefore, while data 121, operating system 122, and voice stream server 123 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the voice stream server 123.

Although computer system 100 is shown to contain only a single processor and a single system bus, those skilled in the art will appreciate that a voice stream server as described herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Computer systems 175 represent computer systems that are connected to the computer system 100 via the network interface 150 in a computer cluster. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allows communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150. In one suitable implementation, the network interface 150 is a physical Ethernet adapter.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
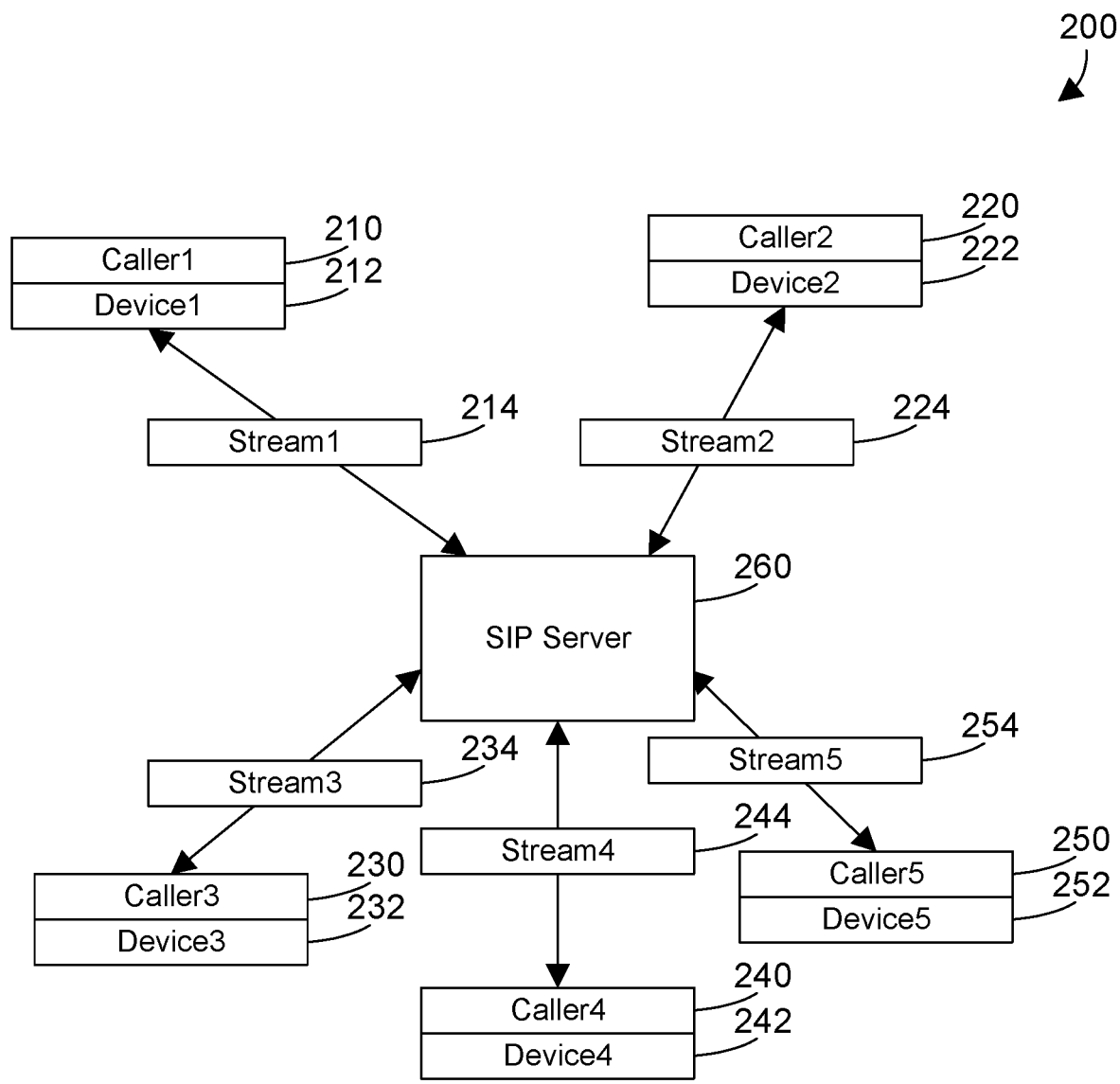
FIG. 2 is a block diagram of a specific voice stream server in accordance with the disclosure and claims herein that connects five different callers to a conference call and processes the streams from those callers.

FIG. 2 shows one sample system 200 within the scope of the disclosure and claims herein. The system includes a Session Initiation Protocol (SIP) server 260 that is one suitable example of the voice stream server 123 shown in FIG. 1. The SIP server 260 is preferably part of a digital telephone system, the other components of which are not shown in FIG. 2. The SIP server 260 preferably includes many of the functions in known SIP servers, but additionally includes the functions described herein with respect to the stream analysis tool 124, the stream modification tool 125, the caller profile database 126, the device signature database 127, the control options 128, and any other function of the voice stream server 123 discussed herein. Five callers are shown in FIG. 2 connected to the SIP server 260, namely, caller1 210, caller2 220, caller3 230, caller4 240 and caller5 250. Each caller is using a corresponding physical device, such as a phone or a computer system, to connect to the SIP server 260. Thus, caller1 210 calls on a corresponding device1 212; caller2 220 calls on a corresponding device2 222; caller3 230 calls on a corresponding device3 232; caller4 240 calls on a corresponding device4 242; and caller5 250 calls on a corresponding device5 252. While some of these devices in FIG. 2 could be digital, one or more of the devices could be an analog device that is connected via analog infrastructure to a digital portion of a digital telephone system to provide an audio stream. For example, if device1 212 is an analog phone, there is analog infrastructure not shown in FIG. 2 that interfaces with digital infrastructure between device1 212 and SIP server 260 so the digital infrastructure provides a digital audio stream1 214 of the call that is generated from the analog device1 212 used by caller1 210. The analog infrastructure and corresponding digital infrastructure that converts the analog voice signal to a digital audio stream is not shown in FIG. 2 because these are well-known in the art. Regardless of whether the caller calls on a digital device or an analog device, the SIP server 260 receives digital audio streams from each caller. Thus, stream1 214 is a digital audio stream that includes both voice and non-voice portions corresponding to the call by caller1 210 on device1 212. Stream2 224 is a digital audio stream that includes both voice and non-voice portions corresponding to the call by caller2 220 on device2 222. Stream3 234 is a digital audio stream that includes both voice and non-voice portions corresponding to the call by caller3 230 on device3 232. Stream4 244 is a digital audio stream that includes both voice and non-voice portions corresponding to the call by caller4 240 on device4 242. Stream5 254 is a digital audio stream that includes both voice and non-voice portions corresponding to the call by caller5 250 on device5 252. Each audio stream conceptually includes data in both directions, which can be on the same communication channel or which can have separate communication channels for send and receive. The SIP server 260 receives the incoming audio streams, analyzes the incoming audio streams, and modifies one of the audio streams based on either the voice portion of the audio stream, the non-voice portion of the audio stream, or both, as described in more detail below.

Figure 3:
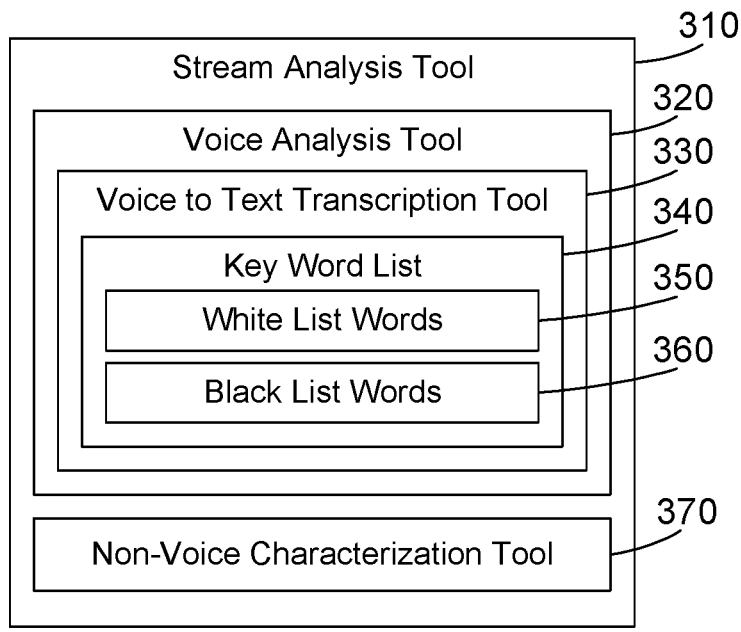
FIG. 3 is a block diagram showing possible details of the stream analysis tool in FIG. 1.

FIG. 3 shows a stream analysis tool 310 that is one suitable example for the stream analysis tool 124 shown in FIG. 1 and discussed above. Stream analysis tool 310 preferably includes a voice analysis tool 320 and a non-voice characterization tool 370. The voice analysis tool 320 analyzes the voice portion of the audio stream, and can modify the audio stream according to things detected in the voice portion of the audio stream. The voice analysis tool 320 preferably includes a voice to text transcription tool 330 that transcribes the audio stream to text in near real-time, and compares the text of the transcription to a key word list 340. The key word list 340 may include white list words 350 and black list words 360. A caller who uses too many black list words in his or her conversation, for example, could have their call placed in listen-only mode by the voice stream server or could have their session terminated by the voice stream server. The non-voice characterization tool 370 determines non-voice characteristics of an audio stream, and can thereby build a device signature for a device being used by the caller. Thus, if the caller is on an analog line that has significant noise, hisses or pops, the non-voice characterization tool can characterize the device being used by the caller.

Figure 4:
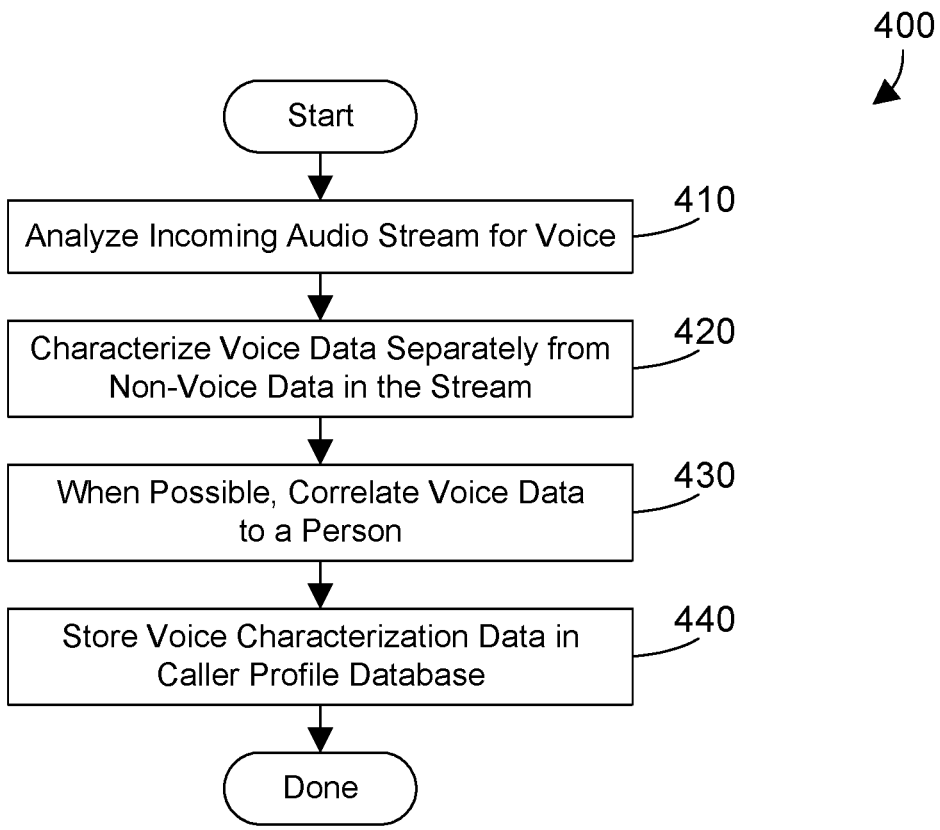
FIG. 4 is a flow diagram of a method for storing voice characterization data in a caller profile database based on analyzing an incoming audio stream for voice data.

Referring to FIG. 4, a method 400 is preferably performed by the voice analysis tool 320 shown in FIG. 3. An incoming audio stream is analyzed for voice (step 410). The voice data in the audio stream is characterized separately from the non-voice data in the audio stream (step 420). When possible, the voice data is correlated to a person (step 430). The voice characterization data is stored in the caller profile database (step 440), such as caller profile database 126 shown in FIG. 1. Method 400 is then done. By storing the voice characterization data in the caller profile database, the voice characterization data for a given caller can be refined over time using data from many different calls. In the alternative, the voice characterization data for each call can be stored separately in the caller profile database, and the voice stream server could then perform any suitable analysis on the voice characterization data for a given user across many different calls.

Figure 5:
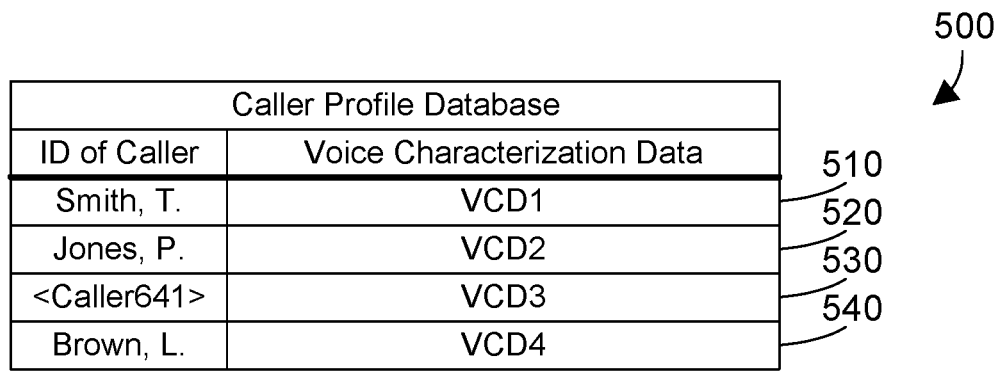
FIG. 5 is a table showing one suitable example of a caller profile database.

One suitable example of a caller profile database 126 in FIG. 1 is shown in a table 500 shown in FIG. 5. We assume for this example each entry in the caller profile database 500 includes an identification of the caller, along with corresponding voice characterization data. Thus, entry 510 includes voice characterization data VCD1 that corresponds to a caller by the name of Smith, T. Entry 520 includes voice characterization data VCD2 that corresponds to a caller by the name of Jones, P. Entry 530 includes voice characterization data VCD3 that corresponds to a caller identified by the voice stream server as Caller641. For this entry, we assume the voice stream server assigns the identifier Caller641 to the voice characterization data VCD3. This allows the voice stream server to store in the caller profile database caller profiles that the voice stream server has not yet specifically identified to a person. Entry 540 includes voice characterization data VCD4 that corresponds to a caller by the name of Brown, L. The simple example table 500 shown in FIG. 5 illustrates that voice characterization data for each caller can be stored in the caller profile database. The voice characterization data VCD1, VDC2, VDC2 and VCD4 is shorthand that is intended to include any suitable voice characterization data.

Figure 6:
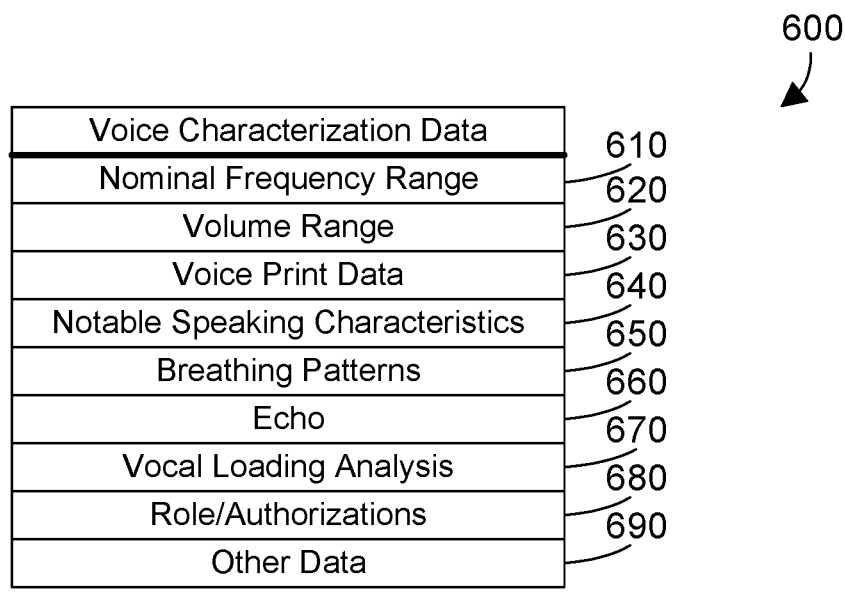
FIG. 6 is a table showing suitable examples of voice characterization data that could be included in the caller profile database in FIG. 5.

The voice characterization data stored in the caller profile database can be any suitable data that characterizes in any way a caller, whether the data is currently known or developed in the future. Examples of voice characterization data that could be included in the caller profile database are shown in the table 600 shown in FIG. 6, and include nominal frequency range 610, volume range 620, voice print data 630, notable speaking characteristics 640, role/authorizations 650, and other data 660. Nominal frequency range 610 preferably specifies a low-to-high frequency characterization of the caller's voice. Volume range 620 preferably specifies the average volume or volume range of a caller's voice. The voice print data 630 preferably specifies voice print data that allow identifying the caller's voice. Notable speaking characteristics 640 could include any data that characterizes a caller's voice, such as a lisp that prevents saying the "S" sound of words correctly, a foreign accent, whether the caller drops certain sounds from words, whether the pitch (or frequency) of a caller's voice goes up when the caller's voice gets faster, etc. Breathing patterns 650 could include any detectable pattern due to the caller breathing. Echo 660 could include any echo that occurs in the voice portion of the audio stream. Vocal loading analysis 670 could include changes in the caller's voice over long periods of talking. For example, as some callers talk longer, their voices will be quieter over time. Role/Authorizations 680 can specify a role or authorization for a particular caller. For example, in a conference call with a company's chief executive officer (CEO), it would be undesirable to put the CEO in listen-only mode. The role/authorizations 680 can be used to enable or disable modification of a caller's audio stream. Other data 690 can include any other suitable data that could characterize the voice portion of the audio stream, whether currently known or developed in the future.

Referring to FIG. 7, a method 700 is preferably performed by the stream analysis tool 310 shown in FIG. 3. An incoming audio stream is analyzed (step 710). The non-voice data is characterized (step 720). The non-voice data is then correlated to a device to generate device signature data (step 730). The device signature data is then stored in a device signature database (step 740). Method 700 is then done. Note the correlation of the non-voice data to a device in step 730 does not necessarily mean the non-voice data is correlated to a specific piece of hardware. Rather, the correlation in step 730 means the non-voice data is correlated to an identifier that the voice stream server assigns to the device, without necessarily knowing the specifics of what the device is or where it is.

The table 800 in FIG. 8 is one suitable example of a device signature database 127 shown in FIG. 1. Each entry in the device signature database preferably correlates an identifier for a device with corresponding device signature data. Thus, entry 810 shows device signature data DSD1 correlated to a device with an ID of 2365. Entry 820 shows device signature data DSD2 correlated to a device with an ID of 3580. Entry 830 shows device signature data DSD3 correlated to a device with an ID of 3921. Entry 840 shows device signature data DSD4 correlated to a device with an ID of 5216.

The device signature data in the device signature database can include any suitable data that can be used to characterize the non-voice portion of an audio stream. Examples of suitable device signature data are shown in table 900 in FIG. 9, and include repetitive sounds 910; transient sounds 920; volume issues 930; caller 940; and other data 950. Repetitive sounds 910 preferably include sounds caused by one or more repetitive events, such as a click or whine caused by a motor that causes noise on an analog telephone line. Repetitive sounds 910 can also include any sound that repeats and any suitable interval. For example, if a caller is on the phone with a lawnmower running outside the caller's office, the noise from the lawnmower will have a repetitive component that could be used to filter out the sound of the lawnmower in the audio stream. Transient sounds 920 preferably include sounds that are not repetitive. Transient sounds 920, for example, could include pops or clicks caused by analog equipment. Volume issues 930 preferably include data that indicates a volume level of the audio stream. If a person is calling on an analog phone in a far-away country, the volume level of the audio stream may be much less than if the caller is calling from within the same company's phone network. Intermittent issues 940 preferably include intermittent sound issues on the line, which can include, for example, choppiness, line breaks and volume issues. Caller 950 is an optional field that can be used, when possible, to correlate the device signature data to a particular caller. Thus, if the voice stream server can determine a poor-quality audio stream correlates to a particular caller, the caller can be specified at 950 in the device signature data. Other data 960 can include any other suitable data that could characterize the non-voice portion of the audio stream, whether currently known or developed in the future.

Figure 10:
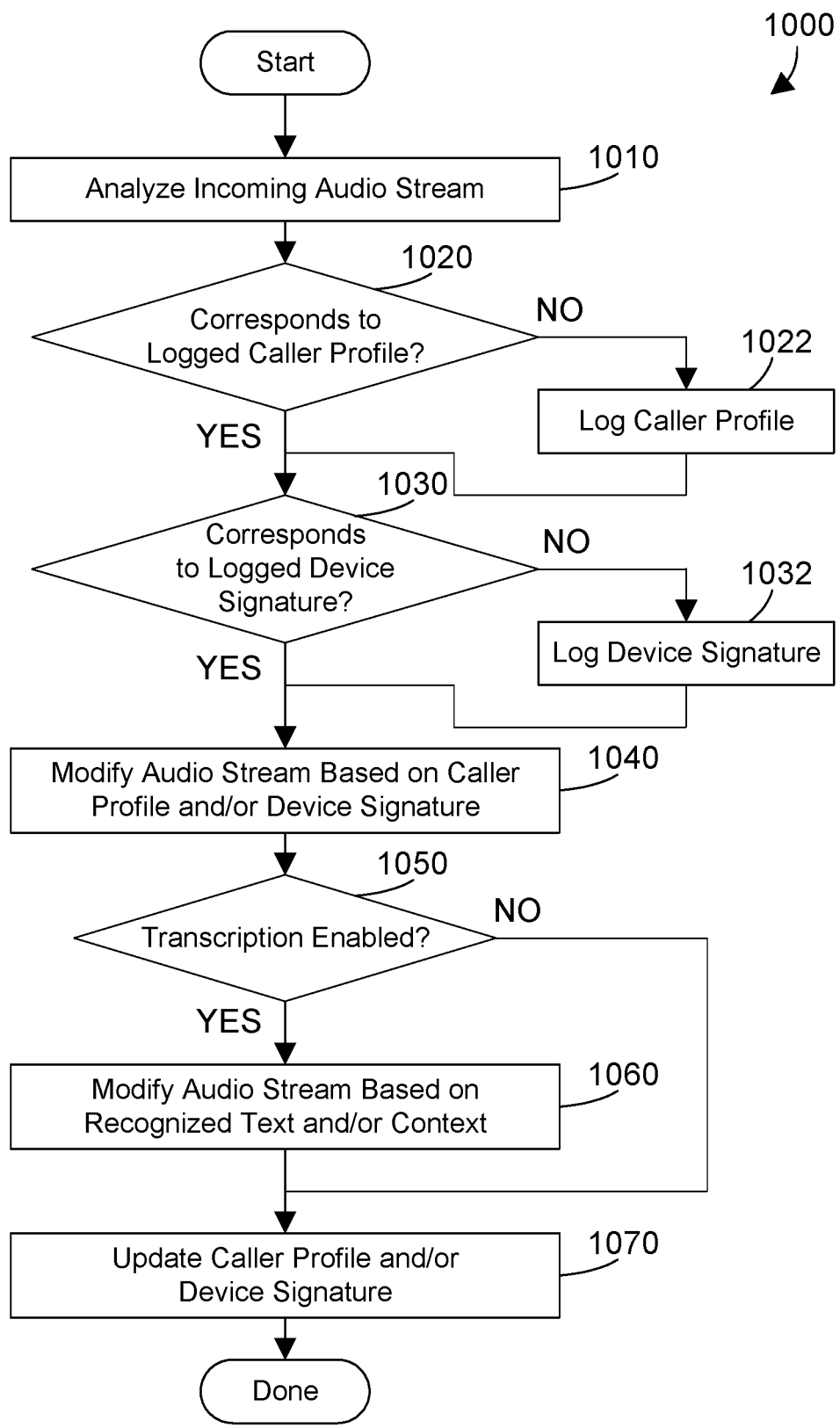
FIG. 10 is a flow diagram of a method for modifying the audio stream of a caller.
Figure 11:
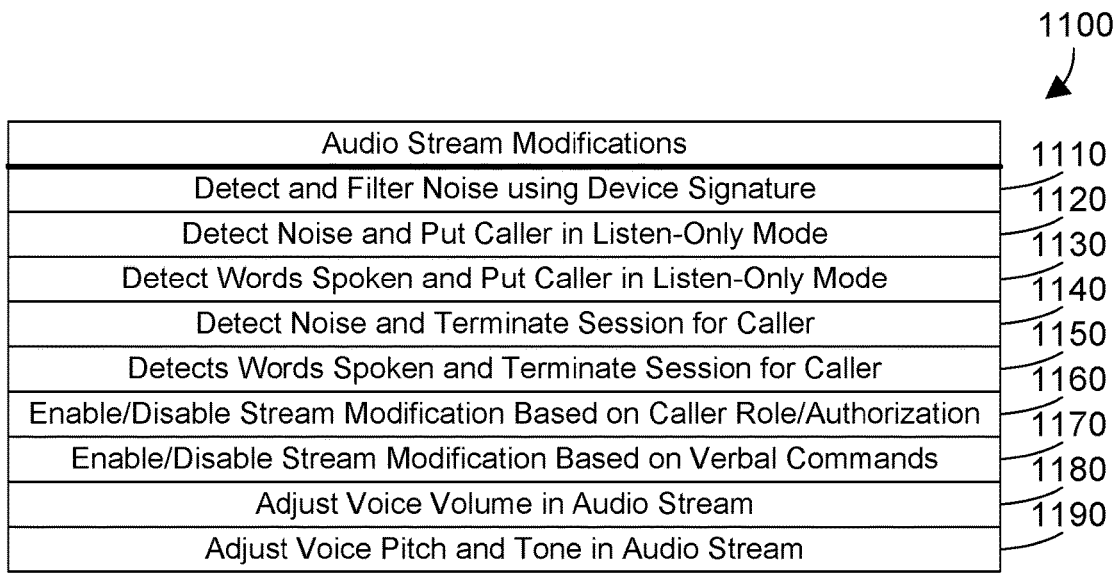
FIG. 11 is a table showing possible audio stream modifications within the scope of the disclosure and claims herein.

Referring to FIG. 10, a method 1000 is preferably performed by the voice stream server 123 in FIG. 1. An incoming audio stream is analyzed (step 1010). When the voice portion of the audio stream does not correspond to a logged caller profile in the caller profile database (step 1020=NO), the caller profile is logged (step 1022). Note at the beginning of the audio stream, an entry is created in the caller profile database, and voice characterization data is then added to the entry as the call progresses. When the incoming audio stream corresponds to a logged caller profile in the caller profile database (step 1020=YES), the identified caller profile can be used to modify the audio stream in step 1040. When the analyzed incoming audio stream in step 1010 does not correspond to a logged device signature in the device signature database (step 1030=N0), an entry is created in the device signature database, and device signature data is then added to the entry as the call progresses. When the incoming audio stream corresponds to a logged device signature in the device signature database (step 1030=YES), the identified device signature can be used to modify the audio stream in step 1040. Note step 1040 can modify the audio stream based on the caller profile, based on the device signature, or both. The modification of the audio stream in step 1040 can include any suitable modification, including without limitation those shown in FIG. 11.

When transcription is not enabled (step 1050=NO), the caller profile and/or device signature are updated (step 1070) through the end of the call, and method 1000 is done. When transcription is enabled (step 1050=YES), the voice data in the audio stream is converted to text, and the audio stream may be modified based on recognized text or context in the audio stream (step 1060). The caller profile and/or device signature are updated (step 1070) through the end of the call, and method 1000 is done.

The voice stream server can perform any suitable modifications to the audio stream in steps 1040 and 1060 in FIG. 10. These modifications could be made, for example, by the stream modification tool 125 shown in FIG. 1. Examples of suitable stream modifications are shown in table 1100 in FIG. 11. Entry 1110 shows stream modifications may include detecting and filtering noise using the device signature. Entry 1120 shows stream modifications may include detecting noise and putting the caller in a listen-only mode. The listen-only mode can be accomplished in numerous different ways. For example, the voice stream server can simply stop forwarding packets of the audio stream from a caller to put the caller in listen-only mode. In a second example, the voice stream server can continue forwarding the packets, but with the voice portion of the packets removed. In a third example, the voice stream server can continue forwarding the packets with the voice portion, but with a volume setting that makes the voice portion inaudible. Entry 1130 shows detecting words spoken and putting the caller in listen-only mode. This would be useful, for example, to prevent someone from using profanity on a conference call. We assume for this example the black list words 360 in FIG. 3 includes profane words, and if a caller uses more than a specified number of words on the black list, or uses certain more offensive words or phrases at all, the detection of these words can cause the voice stream server to put the caller in listen-only mode. Entry 1140 detects noise and terminates a session for a caller. This is useful, for example, when a caller's connection is of such poor quality that it disrupts the entire conference call. Other examples not related to quality of the audio could also be detected, such as detecting music on the line that could be caused, for example, by the caller putting the conference call on hold. Entry 1150 detects words spoken and terminates the session for the caller. This option is available when a caller uses words or phrases that are not appropriate on the call. Entry 1160 allows enabling or disabling modifications of the audio stream based on the caller role or authorization. As stated in an example above, we would not want the system to put a company CEO in listen-only mode or to terminate the session for the CEO. A list of known callers and their roles and/or authorization could fine-tune how the voice stream server functions. Entry 1170 allows enabling or disabling stream modification based on verbal commands. For example, let's assume a conference call is scheduled for a group of twelve people for thirty minutes to discuss non-confidential matter, followed by a fifteen minute session with eight of those same people to discuss confidential matters. The caller role/authorization for each caller could define whether they are cleared to participate in the confidential part of the conference call. At the conclusion of the thirty minute call discussing non-confidential matters, one of the callers, such as a moderator of the call, could give a verbal command such as "starting confidential meeting", which would be recognized by the voice stream server to mean to terminate the session for all callers who are not authorized to participate in the confidential part of the call. Entry 1180 allows adjusting the voice volume of a caller when needed. For example, let's assume a caller is traveling overseas and participates in a conference call using an analog phone on a noisy analog line. The voice stream server could recognize the volume of the caller's voice is less than normal (from the volume range 620 in the caller's voice characterization data in the caller profile database), and increase the volume of the voice portion of the caller's audio stream to make the caller more easily heard. Similarly, if a caller's voice is louder than usual, the voice stream server can decrease the volume of the voice portion of the caller's audio stream. Entry 1190 allows adjusting the caller's pitch and tone in the audio stream. For example, if a caller is traveling overseas and participates in a conference call using an analog phone, and the quality of the line somewhat distorts the caller's pitch and/or tone, the caller's pitch and/or tone could be adjusted to be more "normal" according to the voice characterization data in the caller's entry in the caller profile database.

Figure 12:
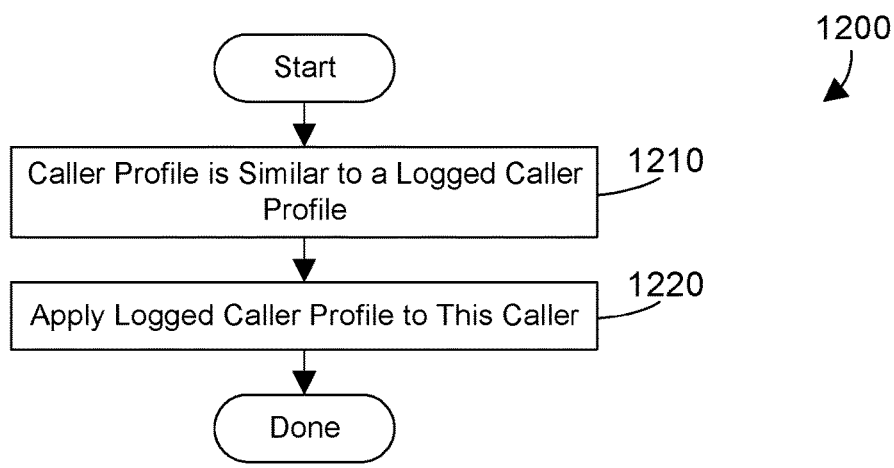
FIG. 12 is a flow diagram of a method for applying a similar caller profile to a caller.

One of the advantages of the voice stream server disclosed herein is the ability to apply past learning to a new call. Referring to FIG. 12, a method 1200 is preferably performed by the voice stream server. When a caller profile is similar to a logged caller profile (step 1210), the logged caller profile may be applied to this caller (step 1220). The degree of similarity in step 1210 can be defined in any suitable way using any suitable algorithm, formula or heuristic. For example, the voice stream server can apply similarity metrics that compare the voice data in the current audio stream with the caller profiles in the caller profile database, and when there is a match above some defined threshold, such as 80%, the logged caller profile is applied to this caller. This is useful, for example, when circumstances create a difference in the voice of a caller, such as when the caller has a cold or has a mild case of laryngitis that affect the caller's voice.

Figure 13:
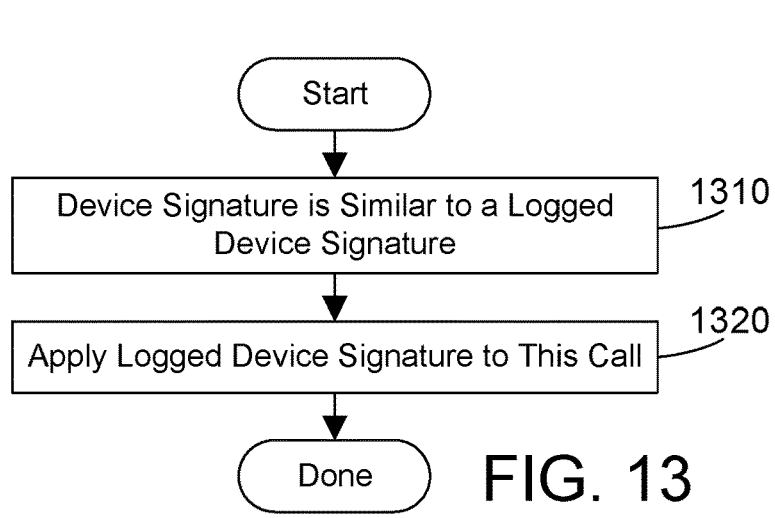
FIG. 13 is a flow diagram of a method for applying a similar device signature to a device on a call.

Not only can the voice stream server apply a caller profile to a new call, it can also apply a logged device signature to a new call. Referring to FIG. 1300, when a device signature for a call is similar to a logged device signature (step 1310), the logged device signature may be applied to this call (step 1320). This would be useful, for example, if a company has a foreign office that has multiple employees that use the same analog phones. Even if the caller cannot be recognized or identified using method 1200 in FIG. 12, the device could be recognized and identified in method 1300 in FIG. 13 if the device was used previously by a different caller for a conference call that was monitored and logged by the voice stream server.

Figure 14:
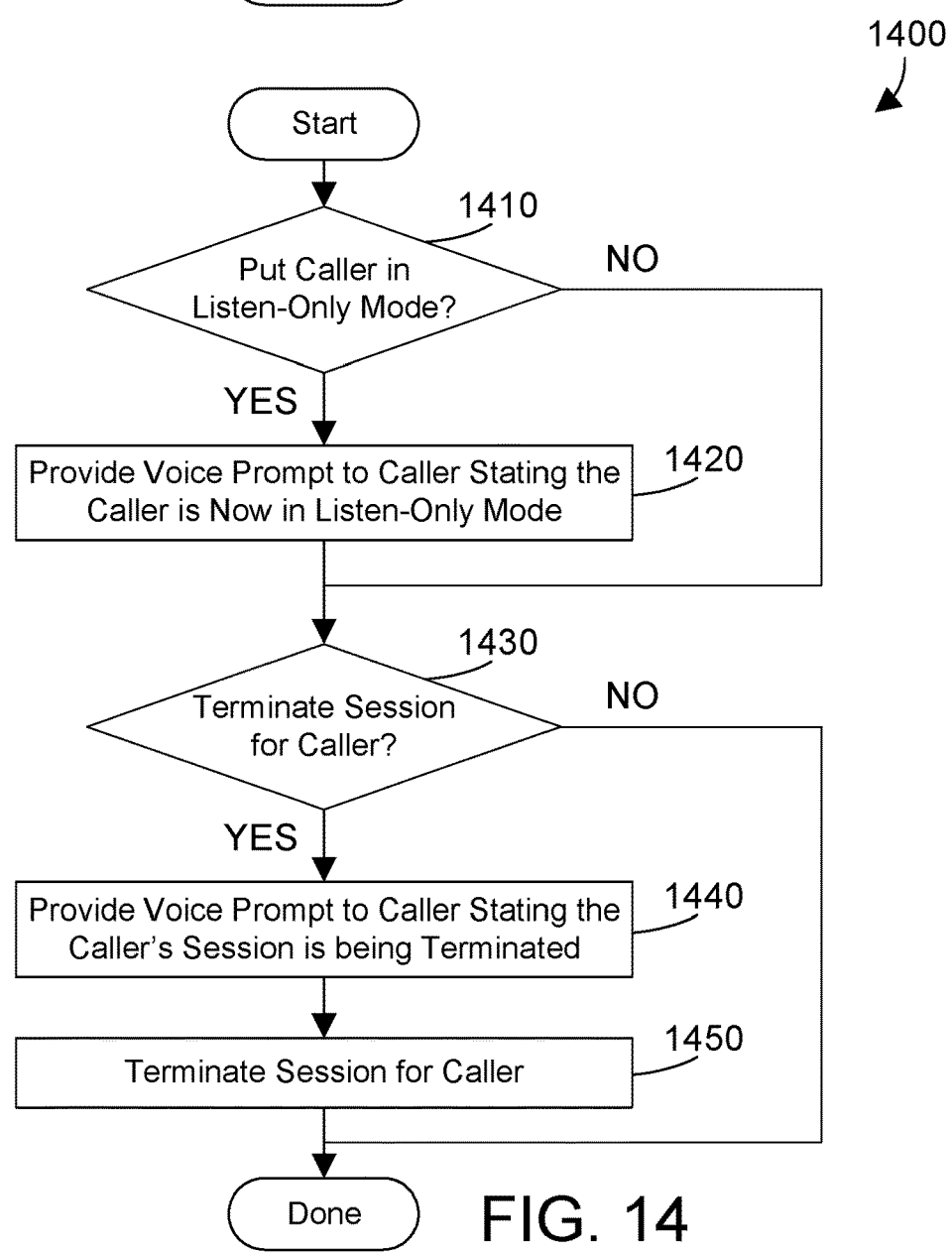
FIG. 14 is a flow diagram for giving a voice prompt to a caller when the caller is placed in listen-only mode or when the caller's session will be terminated.

When the voice stream server puts a caller in listen-only mode, or is about to terminate the session for a caller, it would be desirable for the caller to receive an audio prompt indicating what is happening. Referring to FIG. 14, a method 1400 determines when the caller is put in listen-only mode (step 1410=YES), and in response, provides a voice prompt to the caller stating the caller is not in listen-only mode (step 1420). When the voice stream server is about to terminate a session for a caller (step 1430=YES), a voice prompt is provided stating the caller's session is being terminated (step 1440). The session for the caller is then terminated (step 1450). Method 1400 is then done. Note that different voice prompts could be sent to the caller depending on the circumstances. Thus, when the caller session is being terminated for excessive use of profanity, the voice prompt could state the caller is being terminated for that reason. When the caller is being put in listen-only mode due to excessive noise on the line, the voice prompt could state the caller has been put in listen-only mode due to excessive noise on the caller's end or connection. When the caller session is being terminated because confidential information is about to be discussed for which the caller is not authorized, the voice prompt could state the caller's session is being terminated because the caller is not authorized to continue on the call. In another example, the voice stream server may not recognize a caller who has authority to continue with the confidential part of the call. In this situation, the voice stream server could provide a voice prompt asking the caller to provide a verbal phrase or code to indicate the caller's authorization to continue. When the verbal phrase or code matches an authorization level sufficient to access confidential information, the caller can either remaining on the call or be rejoined to the call. These examples illustrate the voice stream server can provide any suitable type and number of voice prompts.

While the discussion above is in terms of processing audio streams for conference calls in a digital telephone system, these same principles may be used for processing audio streams in different contexts, including on-line classrooms, video chats, and any other application that includes an audio component in streaming data.

The disclosure and claims herein support an apparatus comprising: at least one processor; a memory coupled to the at least one processor; and a voice stream server residing in the memory and executed by the at least one processor, the voice stream server receiving a plurality of audio streams from a plurality of callers, analyzing the plurality of audio streams for voice data and for non-voice data, and modifying a first of the plurality of audio streams based on the analyzed non-voice data in the first audio stream.

The disclosure and claims herein further support an apparatus comprising: at least one processor; a memory coupled to the at least one processor; a caller profile database residing in the memory that includes a plurality of entries, each of the plurality of entries comprising voice characterization data corresponding to a previously-received audio stream for an identified caller; a device signature database residing in the memory that includes a plurality of entries, each of the plurality of entries comprising device signature data corresponding to non-voice portions of a previously-received audio stream for an identified device; and a voice stream server residing in the memory and executed by the at least one processor, the voice stream server receiving a plurality of audio streams from a plurality of callers, analyzing the plurality of audio streams for voice data and for non-voice data, identifying a first entry in the caller database that corresponds to voice data in a first of the plurality of audio streams, modifying the first audio stream based on voice characterization data in the first entry in the caller database, identifying a first entry in the device signature database that corresponds to the first audio stream, and modifying the first audio stream based on the device signature data in the first entry in the device signature database, wherein the voice stream server comprises a voice to text transcription tool that transcribes the voice data in the first audio stream and compares the transcribed text to a key word list, and when specified criteria are satisfied with respect to the occurrence of words in the key word list in the transcribed text, the voice stream server modifies the voice data in the first audio stream by placing a first caller corresponding to the first audio stream in listen-only mode by not forwarding the voice data in the first audio stream received by the voice stream server, wherein the voice stream server provides a voice prompt to the first caller that states the first caller is in listen-only mode, wherein the voice stream server enables and disables modifying the first audio stream based on at least one of: caller role; caller authorization; and verbal commands from at least one caller.

The disclosure and claims herein additionally support a computer-implemented method executed by at least one processor for processing a plurality of audio streams from a plurality of callers, the method comprising: receiving the plurality of audio streams from the plurality of callers; analyzing the plurality of audio streams for voice data and for non-voice data; and modifying a first of the plurality of audio streams based on the analyzed non-voice data in the first audio stream.

A voice stream server is part of a digital telephone system that manages connections to a conference call by multiple callers. The voice stream server receives, sends and manages audio streams for each caller. The voice stream server analyzes audio streams incoming from callers and maintains a database of device signatures and a database of caller profiles based on the analyzed data. The voice stream server receives an audio stream from a caller, analyzes the audio stream to identify an applicable device signature, caller profile, or both, and modifies the audio stream. Modification of the audio stream may include filtering noise, placing the caller in listen-only mode, ending a session for a caller, adjusting voice volume, etc. In addition, modification of the audio stream may vary based on the role or authorization of the caller, or based on verbal commands from one or more of the callers.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a caller profile database residing in the memory that includes a plurality of entries, each of the plurality of entries comprising voice characterization data corresponding to a voice portion of a previously-received audio stream for an identified caller;
   a device signature database residing in the memory that includes a plurality of entries, each of the plurality of entries comprising a device identifier and corresponding device signature data corresponding to non-voice portions of a previously-received audio stream for an identified device corresponding to the device identifier, wherein the device signature data comprises repetitive sounds, transient sounds, and volume issues; and
   a voice stream server residing in the memory and executed by the at least one processor, the voice stream server receiving a plurality of audio streams from a plurality of callers, analyzing the plurality of audio streams for voice data and for non-voice data, identifying a first entry in the caller database that corresponds to a first audio stream of the plurality of audio streams, identifying a first entry in the device signature database that corresponds to the first audio stream, and modifying the first audio stream based on the analyzed voice data and the voice characterization data in the first entry in the caller database and based on the analyzed non-voice data and the device signature data in the first entry in the device signature database.

2. The apparatus of claim 1 further wherein the voice stream server comprises a voice to text transcription tool that transcribes the voice data in the first audio stream to text and compares the text to a key word list, and when specified criteria are satisfied with respect to the occurrence of words in the key word list in the text, the voice stream server modifies voice data in the first audio stream.

3. The apparatus of claim 1 wherein the voice stream server modifies the first audio stream by placing a first caller corresponding to the first audio stream in listen-only mode by not forwarding the voice data in the first audio stream received by the voice stream server.

4. The apparatus of claim 3 wherein the voice stream server provides a voice prompt to the first caller that states the first caller is in listen-only mode.

5. The apparatus of claim 1 wherein the voice stream server modifies the first audio stream by ending a session for a first caller corresponding to the first audio stream.

6. The apparatus of claim 5 wherein the voice stream server provides a voice prompt to the first caller before terminating the session for the first caller that states the session for the first caller is being terminated.

7. The apparatus of claim 1 wherein the voice stream server enables and disables modifying the first audio stream based on:
   caller role;
   caller authorization; and
   verbal commands from at least one caller.

8. The apparatus of claim 1 wherein when the identified caller corresponding to one of the plurality of entries in the caller profile database uses a plurality of devices for a plurality of past calls, the device signature database comprises a plurality of entries corresponding to the plurality of devices used by the identified caller.

9. An apparatus comprising:
at least one processor;
a memory coupled to the at least one processor;
a caller profile database residing in the memory that includes a plurality of entries, each of the plurality of entries comprising voice characterization data corresponding to a voice portion of a previously-received audio stream for an identified caller;
a device signature database residing in the memory that includes a plurality of entries, each of the plurality of entries comprising a device identifier and corresponding device signature data corresponding to non-voice portions of a previously-received audio stream for an identified device corresponding to the device identifier, wherein the device signature data comprises repetitive sounds, transient sounds, and volume issues; and
a voice stream server residing in the memory and executed by the at least one processor, the voice stream server receiving a plurality of audio streams from a plurality of callers, analyzing the plurality of audio streams for voice data and for non-voice data, identifying a first entry in the caller database that corresponds to voice data in a first audio stream of the plurality of audio streams, modifying the first audio stream based on voice characterization data in the first entry in the caller database, identifying a first entry in the device signature database that corresponds to the first audio stream, and modifying the first audio stream based on the device signature data in the first entry in the device signature database, wherein the voice stream server comprises a voice to text transcription tool that transcribes the voice data in the first audio stream to text and compares the text to a key word list, and when specified criteria are satisfied with respect to the occurrence of words in the key word list in the text, the voice stream server modifies the voice data in the first audio stream by placing a first caller corresponding to the first audio stream in listen-only mode by not forwarding the voice data in the first audio stream received by the voice stream server, wherein the voice stream server provides a voice prompt to the first caller that states the first caller is in listen-only mode, wherein the voice stream server enables and disables modifying the first audio stream based on:
caller role;
caller authorization; and
verbal commands from at least one caller.

10. The apparatus of claim 9 wherein when the identified caller corresponding to one of the plurality of entries in the caller profile database uses a plurality of devices for a plurality of past calls, the device signature database comprises a plurality of entries corresponding to the plurality of devices used by the identified caller.

11. A computer-implemented method executed by at least one processor for processing a plurality of audio streams from a plurality of callers, the method comprising:
providing a caller profile database that includes a plurality of entries, each of the plurality of entries comprising voice characterization data corresponding to a voice portion of a previously-received audio stream for an identified caller;
providing a device signature database residing in the memory that includes a plurality of entries, each of the plurality of entries comprising a device identifier and corresponding device signature data corresponding to non-voice portions of a previously-received audio stream for an identified device corresponding to the device identifier, wherein the device signature data comprises repetitive sounds, transient sounds, and volume issues;
receiving the plurality of audio streams from the plurality of callers;
analyzing the plurality of audio streams for voice data and for non-voice data;
identifying a first entry in the caller database that corresponds to a first audio stream of the plurality of audio streams;
identifying a first entry in the device signature database that corresponds to the first audio stream; and
modifying the first audio stream based on the analyzed voice data and the voice characterization data in the first entry in the caller database and based on the analyzed non-voice data and the device signature data in the first entry in the device signature database.

12. The method of claim 11 further comprising:
transcribing the voice data in the first audio stream to text; and
comparing the text to a key word list; and
when specified criteria are satisfied with respect to the occurrence of words in the key word list in the text, modifying voice data in the first audio stream.

13. The method of claim 11 wherein the step of modifying the first audio stream based on the analyzed voice data in the first audio stream comprises placing a first caller corresponding to the first audio stream in listen-only mode by not forwarding the voice data in the first audio stream.

14. The method of claim 13 further comprising providing a voice prompt to the first caller that states the first caller is in listen-only mode.

15. The method of claim 11 wherein the step of modifying the first audio stream based on the analyzed voice data in the first audio stream comprises ending a session for a first caller corresponding to the first audio stream.

16. The method of claim 11 further comprising enabling and disabling modifying the first audio stream based on:
caller role;
caller authorization; and
verbal commands from at least one caller.

17. The method of claim 11 wherein when the identified caller corresponding to one of the plurality of entries in the caller profile database uses a plurality of devices for a plurality of past calls, the device signature database comprises a plurality of entries corresponding to the plurality of devices used by the identified caller.

* * * * *